July 30, 1957 L. T. COOKSON ET AL 2,801,025

COUNTER WITH DISK DEVICE

Filed Jan. 7, 1955 2 Sheets-Sheet 1

INVENTORS.
LEONARD T. COOKSON
WILLIAM RALPH SMITH
BY
ATTORNEY

July 30, 1957 L. T. COOKSON ET AL 2,801,025

COUNTER WITH DISK DEVICE

Filed Jan. 7, 1955 2 Sheets-Sheet 2

INVENTORS.
LEONARD T. COOKSON
WILLIAM RALPH SMITH
BY
ATTORNEY

United States Patent Office 2,801,025

Patented July 30, 1957

2,801,025

COUNTER WITH DISK DEVICE

Leonard T. Cookson and William Ralph Smith, Kalamazoo, Mich., assignors to The Upjohn Company, Kalamazoo, Mich., a corporation of Michigan Application January 7, 1955, Serial No. 480,314

4 Claims. (Cl. 221—203)

This invention relates in general to a disk-type machine for counting small articles having relatively uniform shape characteristics, and more particularly to a disk for said machine whereby said articles are quickly and accurately oriented in predetermined groups to effect such counting.

The effectiveness and convenience of disk-type counters is well known in the art, particularly for the purpose of counting small articles of uniform size and shape. In the pharmaceutical industry, for example, disk-type counters have been successfully used with a wide variety of coated tablets and capsules, particularly with those having a substantially spherical shape. In such cases, the disk of the counting machine is provided with a plurality of through openings whose axes are substantially normal to the upper surface of said disk. The disk is rotated in a plane usually slightly inclined to the horizontal and about a central axis normal thereto, and an enclosure is provided around a portion of the upper surface into which a plurality of the articles, such as tablets or capsules, are placed. As the disk rotates, the articles drop into said openings. A support plate is disposed immediately beneath said disk for preventing the said articles from dropping completely through said openings until they reach a predetermined point in their rotation, which point is generally positioned laterally of the enclosure above mentioned.

Heretofore, however, certain types of capsules and/or tablets, such as uncoated, relatively flat and circular tablets, could not be counted in a desirable manner with the conventional types of disk counter. A primary reason for this has been that such tablets would not drop individually and/or completely into the openings provided in the disk. They may slide over and miss the openings entirely or double up in an opening already occupied and, in some cases, partially extend from said opening above the upper surface of the disk where they may become damaged by the abrading action of other tablets moving across the top of the disk. Uncoated tablets, particularly, are often relatively soft and this abrading action will not only seriously damage such tablets by chipping or breaking, but will also produce a powder or dust which will drop into the containers for these tablets during the counting process. This dust is especially undesirable where transparent containers are used because it clouds the interior walls of such containers and renders them unattractive in appearance. Furthermore, the tablets which have become damaged also drop into the containers and produce an unsightly, often unsalable, product.

Accordingly, a primary object of this invention has been the provision of a counting disk which will accurately effect the separation of a plurality of articles, such as tablets or capsules, having uniform shape characteristics, but not necessarily spherical, from an unorganized mass thereof and conduct them to a receiving point.

A further object of this invention has been the provision of structure, as aforesaid, whereby existing disk-type counters can be easily and quickly modified for use with a variety of differently, but uniformly, shaped capsules and/or tablets.

A further object of this invention has been the provision of structure, as aforesaid, whereby uncoated tablets of relatively soft material can be easily and accurately counted with a disk-type counter without materially damaging said tablets and without creating an objectionable dust condition.

A further object of this invention is the provision of structure, as aforesaid, which creates sufficient agitation of the tablets on said disk to place a tablet in each opening without appreciably damaging said tablets and which eliminates the necessity of using excessive quantities of tablets in order to insure filling of each opening in the disk.

Other objects and purposes of this invention will become apparent to persons acquainted with this type of equiment upon reading the following specification and examining the accompanying drawings, in which.

In meeting the objects and purposes set forth hereinabove, as well as others related thereto, we have provided in one preferred embodiment of our invention a plurality of discontinuous, concentric, arcuate grooves 10 (Figure 1) in the upper surface of the disk 11 of a disk-type counter 12. A plurality of openings 21 communicate between said grooves and the lower surface of said disk.

Figures 1, 2:
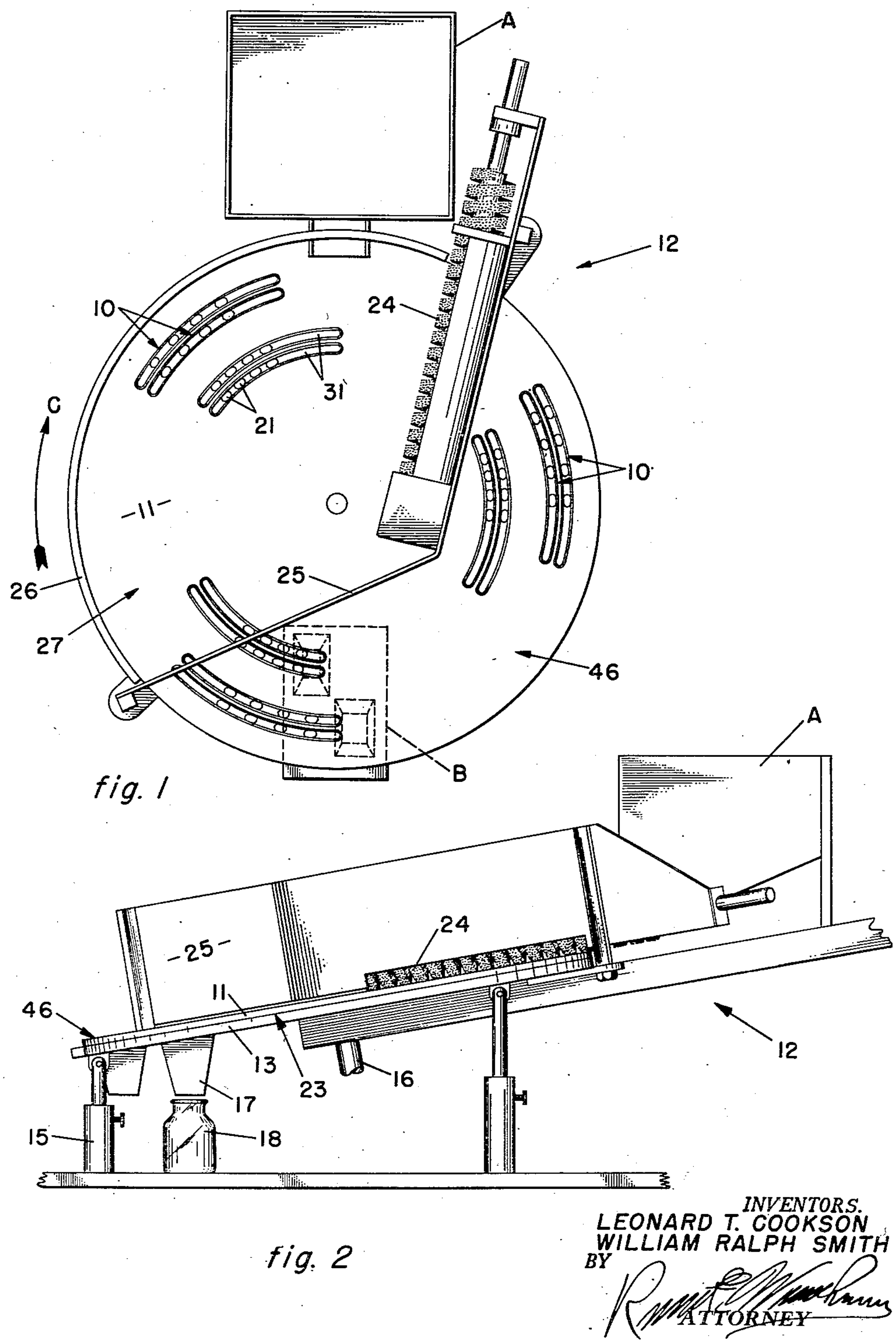
Figure 1 is a top plan view of a disk-type counting machine having a disk embodying our invention.
Figure 2 is a side elevation view of said counting machine.

The terms "upper," "lower" and derivatives thereof as used herein will have reference to the machine and parts thereof as appearing in Figure 2. The terms "inner," "outer" and derivatives thereof will have reference to the geometric center of the disk 11 and parts associated therewith.

*Detailed construction*

As shown in Figures 1 and 2, the counter 12 has a flat disk 11 which is mounted for rotation about a substantially upright, preferably slightly inclined, shaft 16. Positioned below the disk 11, but spaced with only running clearance therefrom, is a support plate 13 which is in turn mounted upon the base 14 by means of the adjustable support posts 15 and disk 11 is rotated by any suitable means, not shown, connected to the shaft 16. A source of articles, as a hopper, is indicated at "A." The support plate 13 is provided with discharge structure "B" including one or more removable and downwardly extending chutes 17 over which the grooves 10 in the disk 11 pass. The chutes 17 are placed at one side of the enclosure 27, as shown in Figure 1. Containers 18 are placed below the chutes 17 for receiving the small articles, such as the tablets 19 (Figures 4 and 5), lodged in the openings 21 communicating between the bottom wall 22 of the grooves 10 and the lower side 23 of the disk 11.

Circulating means including the rotary brush 24 (Figure 1) the baffle 25 and the rail 26, combine to provide the enclosure 27 for receiving articles from the source "A" on the upper surface of the disk 11, and to assist in the movement and guidance of the articles about the upper surface of the disk. For further details regarding the construction and operation of the brush 24, baffle 25, rail 26 and associated parts, reference is made to our co-pending application, Serial No. 480,466, entitled "Counter with Rotating Device," filed January 7, 1955.

Figures 3, 4, 5, 6, 7, 8, 9, 10, 11:
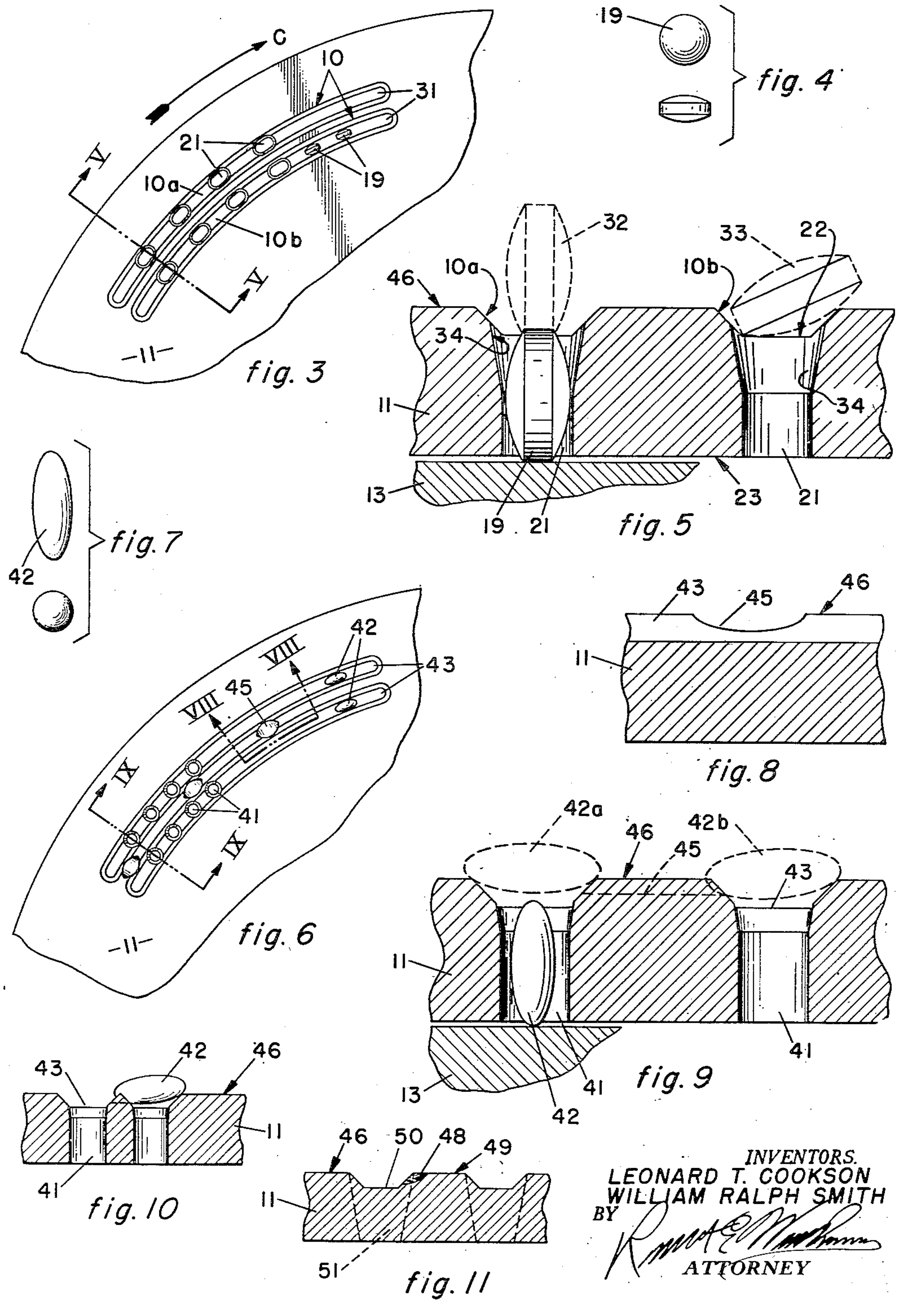
Figure 3 is an enlarged fragment of the counting disk shown in Figure 1.
Figure 4 shows top and side elevation views of an uncoated tablet of the type for which the disk shown in Figure 3 has been designed.
Figure 5 is a sectional view substantially as taken along the line V—V of Figure 3.
Figure 6 is a fragment of a modified disk.
Figure 7 shows top and end elevation views of a capsule having an oblate shape for which the disk shown in Figure 6 has been designed.
Figure 8 is a sectional view taken along the line VIII—VIII of Figure 6.
Figure 9 is a sectional view taken along the line IX—IX of Figure 6 and showing in broken lines typical positions of capsules.
Figure 10 is a sectional view substantially as taken along the line IX—IX of Figure 6 showing a further modification.
Figure 11 is a sectional view substantially as taken along the line IX—IX of Figure 6 and showing a still further modification.

As appearing in Figures 1 and 3, the disk 11 rotates in a clockwise direction indicated by the arrow "C." The openings 21 in the disk 11 are spaced from the leading ends 31 of the grooves 10. For convenience, the outer groove of the two grooves shown in Figure 3 has been indicated as **10*a* and the inner groove as 10*b***.

The openings 21 are preferably of such cross-sectional area that the articles being handled will be freely, though closely, held in such a position that they will rest on the support plate on their narrowest edges while moving along said support plate and will then drop freely out of said openings when they reach the opening in the support plate above and in register with the chutes 17. Thus, for handling a disk-shaped tablet, as the tablets 19 herein shown, the openings 21 will each be of width equal to the thickness of the tablet, and of length equal to the diameter of the tablet, plus with respect to each dimension a sufficient clearance distance to provide the tablets with an easy passage therethrough. Similarly, the diameter of the round openings 41 (Figure 9) for the capsules 42 will be equal to the maximum transverse diameter of the capsules plus a clearance distance sufficient to permit their easy passage therethrough. This will cause the disk-shaped tablets to roll on their peripheries along the support plate 13 and it will cause the elongated, oblate, capsules to ride on their points. Appropriate shapes for these openings will be apparent in connection with articles of other shapes.

In this particular embodiment, the side walls of the grooves 10 (Figure 5) are sloped at an angle of approximately 45 degrees to the surface of the disk and converge downwardly toward the bottom wall 22 of said groove. The openings 21 may be provided with tapered throats 34 to facilitate the dropping of said tablets thereinto. However, such structural details, though designed for, and essential in, the application of the disk to a capsule or tablet of the particular external contour shown in the drawings, may be varied as indicated below with variations in the contour of the articles being handled within the scope of this invention.

By way of example, reference is made to Figures 6 and 9 wherein the openings 41 are designed to accommodate capsules 42 which are substantially oval shaped with circular cross-sections (Figure 7). Here the capsules 42 will slide along the grooves 43 endwise (Figure 6) until they reach an unoccupied opening 41 into which they can then drop. Because they may become disposed crosswise of a groove, as indicated in broken lines **42*a* in Figure 9, the notches 45 (Figures 6 and 8) are preferably provided in the upper surface 46 of the disk 11 communicating between a pair of adjacent grooves 43. This permits one end of the sidewardly rolling capsule 42*b*, astraddle one of the grooves 43, to drop into said notch 45, as shown in Figure 9, thereby swinging the other end of said capsule into line within the said one of the grooves 43**.

Figure 10 shows a slightly modified structure wherein the space between a pair of adjacent grooves is reduced to a minimum. Figure 11 shows a further alternate structure wherein the notch 48 does not extend entirely across the land 49 between a pair of widely spaced, adjacent grooves 50, each having openings 51 associated therewith.

*Operation*

The operation of our invention will be apparent from the above description. However, in the interest of completeness, further details of the operation are given hereinafter.

As appearing in Figure 1, the disk 11 in this particular embodiment rotates in a clockwise direction "C" toward the brush 24, and said brush sweeps said disk 11 with an oppositely directed motion. Thus, the brush 24 tends to sweep the articles from the leading ends 31 of the grooves 10 toward their trailing ends as said disk 11 passes beneath the brush.

A circular tablet 19 (Figure 3) may move along the leading end portion 31 of a groove, as the groove **10*a*, in a variety of positions. Two of the most usual positions are indicated in broken lines at 32 and 33 in Figure 5. In either position, it will be easily seen that when the tablet reaches a position in the groove 10*a* below which an opening 21 is located, the tablet will drop into said opening unless it has been previously occupied by another tablet, and will assume the position shown in solid lines in Figure 5. If the opening is already occupied, the unlocated tablet will then roll easily and quickly over the top of the tablet located in the opening and continue down the groove until it comes to an opening which is not occupied. As the disk 11 is rotated over the surface of the support plate 13 (Figure 5), tablets 19 within the openings 21 will roll in a substantially vertical plane along the surface of the support plate 13 until they reach the chute 17. This involves very little, often no, powdering or other damage even where relatively soft tablets are involved. As shown in Figure 3, the openings 21 are elongated in the direction of rotation of the disk 11, thereby preventing the tablets 11** from taking a position crosswise of the movement of the disk.

The large, unobstructed land areas located circumferentially between the discontinuous grooves permit the tablets both to move radially outwardly across the disk adjacent the baffle 25 for reception into the radially outermost of the grooves and they also permit the tablets to move radially inwardly along the brush 24 as above described without being hindered by the grooves. The discontinuity of said grooves also effects a further agitation of said tablets without damaging them, thereby assuring that every opening 21 is filled with a tablet as said opening passes under the brush 24, or similar device, defining that portion of the enclosure 27.

The function of the form of the device shown in Figures 6 to 11 with articles of other shapes, as the oblate capsules of Figure 7, will be readily understood. Those of the capsules which drop into the grooves 43 and parallel therewith will slide along said grooves until they reach an empty one of the openings 41 and one capsule will then drop thereinto. By causing the capsule to ride on its point, the opening 41 is of minimum size and this insures that only one capsule will enter each opening in order to prevent jamming and/or miscounting. Where a capsule becomes positioned cross-wise of the grooves 43, as indicated in broken lines in Figure 9, it will roll therealong with a minimum of resistance until one end encounters a notch 45 (or 48 in Figure 11). Since such notch engages only one end of the capsule, the capsule will move into alignment with one of the grooves 43 and drop thereinto, whence it will continue along such groove to an opening 41 as above described.

The notches 45 and 48 also assist in inducing harmless, effective movement of the capsules and tablets along the surface of the disk 11. Said notches may be used for this purpose with tablets of the style shown in Figure 4, but they are particularly helpful where elongated or oval shaped capsules, such as those shown in Figure 7 are being counted.

Figure 11 discloses alternate structure for the openings 51 penetrating the disk 11. The operation of this structure will be apparent from the description given above.

From the modified and alternate structures shown herein, anyone skilled in the art will be able to provide the other variations which are desirable where other and different types and shapes of capsules or tablets are to be counted.

Therefore, although particular, preferred embodiments of our invention have been disclosed herein for illustrative purposes, it will be understood that modifications and variations thereof within the scope of such disclosure are fully contemplated unless specifically stated to the contrary in the appended claims.

We claim:

1. A counting plate for handling tablets of dry pressed finely divided material characterized by a high degree of frangibility and a tendency for material on the surface of said tablet to separate from the main body thereof, said tablets being of generally disk-like shape, the combination comprising: a generally circular body part having substantially parallel upper and lower surfaces; a plurality of circumferentially discontinuous grooves arranged concentrically around the center of said plate, the width of said grooves being materially greater than the depth of said grooves, circumferentially spaced openings extending from the bottom of each of said grooves through said lower surface, said openings being each greater in circumferential length than the width of said grooves, substantially equal to said circumferential length in depth and less than the width of said grooves in radial width; whereby tablets of said disk-like shape whose diameter is only an easy clearance distance less than the length of said openings and whose thickness is only an easy clearance distance less than the width of said openings will be only gently agitated by the discontinuity of said grooves, will drop one edge but only one edge into said grooves preparatory to an easy entrance into said openings and will be received one at a time into said openings and will be held substantially entirely below said groove, with a median plane through each tablet parallel with the diameter thereof extending substantially perpendicular to the plane of said surfaces and tangent to the center line of said grooves to effect rolling of said tablets along and on a supporting plate located below said counting plate.

2. A counting plate for handling tablets of dry pressed finely divided material characterized by a high degree of frangibility and a tendency for material on the surface of said tablet to separate from the main body thereof, said tablets being of generally disk-like shape having a first dimension constituting the diameter thereof and a second dimension constituting the thickness thereof, said second dimension being materially less than said first dimension, the combination comprising: a generally circular body part having a plurality of circumferentially discontinuous grooves arranged concentrically around the center of said plate, the width of said grooves being less than said first dimension and more than half of said first dimension and the depth of said grooves being not materially greater than said second dimension; circumferentially spaced openings extending from the bottom of each of said grooves through said lower surface, said openings being each only an easy clearance distance greater than said first dimension in circumferential length, substantially equal to said first dimension in depth and only an easy clearance distance greater than said second dimension in radial width; whereby said tablets will be only gently agitated by the discontinuity of said grooves, will drop one edge but only one edge into said grooves preparatory to an easy entrance into said openings and will be received one at a time into said openings, will be held substantially entirely below said groove, with a median plane through each tablet parallel with the diameter thereof extending substantially perpendicular to the plane of said surfaces and tangent to the center line of said grooves to effect rolling of said tablets along and on a supporting plate located below said counting plate.

3. The structure as defined in claim 1, wherein said openings are spaced from that end of each of said grooves which leads when said plate is rotating in normal use.

4. The structure as defined in claim 2, wherein said openings are spaced from that end of each of said grooves which leads when said plate is rotating in normal use.

References Cited in the file of this patent

UNITED STATES PATENTS

| | | |
|---|---|---|
| 453,873 | Upjohn | June 9, 1891 |
| 806,032 | Wertz et al. | Nov. 28, 1905 |
| 835,040 | Snyder | Nov. 6, 1906 |
| 1,495,178 | Hodgdon | May 27, 1924 |
| 2,515,594 | Fischman | July 18, 1950 |